United States Patent
Okada et al.

(10) Patent No.: US 9,294,651 B2
(45) Date of Patent: Mar. 22, 2016

(54) IMAGE READING DEVICE FOR READING DOCUMENT IMAGES WITH VISIBLE LIGHT AND NON-VISIBLE LIGHT BEING SWITCHINGLY APPLIED

(75) Inventors: Kouji Okada, Tokyo (JP); Tetsuichiro Yamamoto, Tokyo (JP); Hiroshi Hoshimiya, Tokyo (JP)

(73) Assignee: NEC Engineering, LTD., Tokyo (JP)

( * ) Notice: Subject to any disclaimer, the term of this patent is extended or adjusted under 35 U.S.C. 154(b) by 1157 days.

(21) Appl. No.: 13/263,772

(22) PCT Filed: Apr. 8, 2010

(86) PCT No.: PCT/JP2010/002574
§ 371 (c)(1),
(2), (4) Date: Nov. 9, 2011

(87) PCT Pub. No.: WO2010/119650
PCT Pub. Date: Oct. 21, 2010

(65) Prior Publication Data
US 2012/0127543 A1     May 24, 2012

(30) Foreign Application Priority Data
Apr. 13, 2009   (JP) ................................. 2009-096580

(51) Int. Cl.
*H04N 1/04*         (2006.01)
*H04N 1/46*         (2006.01)

(52) U.S. Cl.
CPC ........... *H04N 1/0402* (2013.01); *H04N 1/0446* (2013.01)

(58) Field of Classification Search
None
See application file for complete search history.

(56) References Cited

U.S. PATENT DOCUMENTS

| | | | |
|---|---|---|---|
| 4,661,703 A | 4/1987 | Ishikawa et al. | |
| 6,023,532 A * | 2/2000 | Kanesaka et al. | 382/274 |
| 6,891,645 B1 * | 5/2005 | Nakamura | 358/474 |
| 2003/0142371 A1 * | 7/2003 | Hanabusa et al. | 358/475 |
| 2007/0205355 A1 * | 9/2007 | Kikuchi | 250/208.1 |
| 2008/0285070 A1 * | 11/2008 | Takeuchi et al. | 358/1.15 |

FOREIGN PATENT DOCUMENTS

| | | |
|---|---|---|
| CN | 1170932 A | 1/1998 |
| CN | 1438801 A | 8/2003 |
| CN | 1573822 A | 2/2005 |

(Continued)

OTHER PUBLICATIONS

International Search Report for PCT/JP2010/002574 mailed May 11, 2010.

(Continued)

*Primary Examiner* — Mohammad Ghayour
*Assistant Examiner* — Pawandeep Dhingra

(57) ABSTRACT

An image reading device includes: a CCD for reading an image on a document to output an image signal; a light source for switchingly emitting visible light and non-visible light; and lighting control means for controlling lighting periods of the light source. The lighting control means is adapted to perform control such that a first light source lighting period for applying non-visible light is longer than a second light source lighting period for applying visible light. The image reading device also includes splitting means for splitting the image signals outputted from the CCD into an image signal upon application of visible light and an image signal upon application of non-visible light.

9 Claims, 4 Drawing Sheets

(56) References Cited

FOREIGN PATENT DOCUMENTS

| | | | |
|---|---|---|---|
| CN | 1697191 | A | 11/2005 |
| CN | 1984221 | A | 6/2007 |
| JP | 60-10872 | A | 1/1985 |
| JP | 9-44633 | A | 2/1997 |
| JP | 11-331493 | A | 11/1999 |
| JP | 2000134431 | A | 5/2000 |
| JP | 2001069324 | A | 3/2001 |
| JP | 2003233142 | A | 8/2003 |
| JP | 2003337385 | A | 11/2003 |
| JP | 2004126721 | A | 4/2004 |
| JP | 2004355262 | A | 12/2004 |
| JP | 2007164385 | A | 6/2007 |
| JP | 2007215050 | A | 8/2007 |
| JP | 2007215052 | A | 8/2007 |
| JP | 2007243249 | A | 9/2007 |

OTHER PUBLICATIONS

Chinese Office Action for CN Application No. 201080016506.1 issued on Nov. 11, 2013 with English Translation.

Diego A. Socolinsky et al., "A Comparative Analysis of Face Recognition Performance with Visible and Thermal Infrared Imagery", 2002 Proceedings 16th International Conference on Pattern Recognition, vol. 4, pp. 217-222, ISSN: 1051-4651. Cited in TW Office Action on p. 5-7.

Taiwanese Office Action for TW Application No. 099111462 issued on Mar. 26, 2014 in original TW language.

The Extended European Search Report for EP10764237.3 dated on May 24, 2013.

Japanese Office Action for JP2009-096580 issued Sep. 26, 2011.

\* cited by examiner

IMAGE READING DEVICE FOR READING DOCUMENT IMAGES WITH VISIBLE LIGHT AND NON-VISIBLE LIGHT BEING SWITCHINGLY APPLIED

TECHNICAL FIELD

The present invention relates to image reading devices for reading images on documents to output image signals, and specifically, to devices for reading document images with visible light and non-visible light being switchingly applied thereto.

BACKGROUND ART

As a device for reading images of a subject (document images), such as printing materials and photos, such image reading devices are in practical use as to read images with an image sensor while applying light from a light source to output image signals (for example, see PL1).

Image reading devices are widely used in the field of inspection devices for checking conditions of printed materials upon completion of printing, in addition to copiers and facsimiles (FAXs). In recent years, use of image reading devices is positively considered with regard to inspection on printed materials in which regular ink and special ink are used in combination. This case involves separate acquisition of document images corresponding to portions printed with regular ink and document images corresponding to portions printed with special ink.

As special ink, for example, such an ink is used in some cases as to be reactive only to non-visible light, e.g., infrared light and ultraviolet light, and incapable of being read by application of visible light. For this reason, an image reading device for obtaining document images with visible light and an image reading device for obtaining document images with non-visible light are installed independently of each other, and images needed are obtained accordingly by means of these image reading devices. However, cost is increased as a whole in case of installing discrete image reading devices, for the image reading devices are needed by the number corresponding to the kinds of inks.

CITATION LIST

Patent Literature

PL1: JP-A-2004-126721

SUMMARY OF INVENTION

Technical Problem

To suppress cost, a configuration is preferred such that reading devices for visible light and for non-visible light are integrated so as to switchingly apply visible light and non-visible light to read printed materials. However, CCDs (Charge Coupled Device) for use as a reading device have considerably different sensitivities to visible light and to non-visible light. Thus, merely switchingly applying visible light and non-visible light causes extreme difference in brightness in visible light images and non-visible light images.

Particularly in case of reading an image printed with fluorescent ink sensitive to ultraviolet light, the ink is applied with ultraviolet light for causing luminescence, and the luminescent light is read by the CCD. However, since the intensity of luminescence of the ink is very weak, ultraviolet light images turn undesirably black to such a degree that the contents of the images cannot be visually recognized, in case where the device is designed in terms of its sensitivity to visible light.

In image reading devices, signal processing such as shading correction is generally performed on image signals. Since the sensitivity of the CCD is vastly different to visible light and to non-visible light, a significant difference in level occurs in image signals outputted from the CCD upon application of visible light and upon application of non-visible light.

When image signals obtained with visible light and image signals obtained with non-visible light are inputted to a signal processing circuit with the difference in level being considerable, uniform signal processing is hardly performed on both the image signals. In particular, in case where the difference in level between the image signals is beyond the permissible range for input of the signal processing circuit, signal processing itself cannot be performed, which results in the need of disposing a signal processing circuit for visible light and a signal processing circuit for non-visible light independently of each other.

The present invention was made in view of the foregoing problems in the background art, and it is an object of the invention to enable acquisition of images with stable brightness as well as performance of appropriate signal processing with one signal processing means in an image reading device for obtaining document images through switching application of visible light and non-visible light.

Solution to Problem

The present invention relates to an image reading device for reading an image on a document with visible light and non-visible light being switchingly applied thereto, including: an image sensor for reading the image on the document to output an image signal; a light source for switchingly emitting visible light and non-visible light; and lighting control means for controlling lighting periods of the light source, wherein the lighting control means is adapted to perform control such that a first light source lighting period for applying non-visible light is longer than a second light source lighting period for applying visible light.

The present invention allows for reading of images with light quantities that match the sensitivity of the image sensor for either case of applying visible light or non-visible light. Thus, images with stable brightness can be obtained. Differences in level among image signals can also be suppressed. Hence, appropriate signal processing is possible with the one single processing means on individual image signals.

Advantageous Effects of Invention

The present invention provides an image reading device for obtaining document images with switching application of visible light and non-visible light, the device allowing for acquisition of images with stable brightness and performance of appropriate signal processing.

DESCRIPTION OF EMBODIMENTS

Exemplary embodiments of the present invention are described in detail below with reference to the drawings. An image reading device is used in, for example, an inspection device for inspecting conditions of printed materials printed with a combination of regular ink that is readable through application of visible light and special ink that is readable through application of non-visible light.

Figure 1:
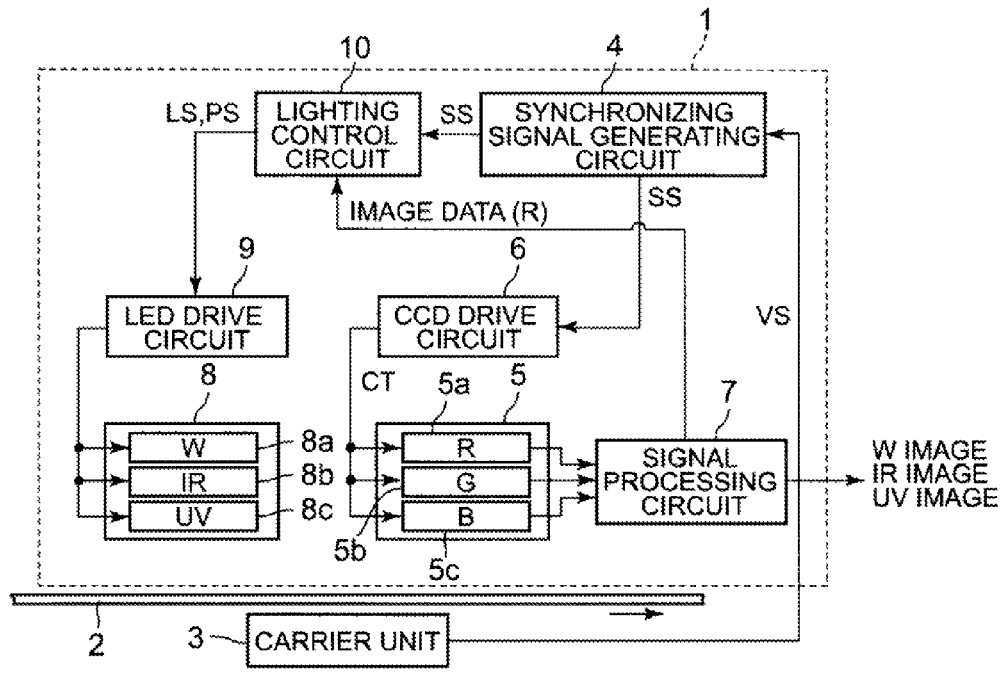
FIG. 1 is a block diagram of one exemplary embodiment of an image reading device according to the present invention.

FIG. 1 is an overall configuration diagram depicting one exemplary embodiment of the image reading device. The image reading device 1 is configured as an image reading unit and is provided separately from a carrier unit 3 for carrying documents (printed materials) 2. The image reading device 1 includes, for example, a synchronizing signal generating circuit 4, a CCD 5, a CCD drive circuit 6, a signal processing circuit 7, an LED 8, an LED drive circuit 9, and a lighting control circuit 10.

The synchronizing signal generating circuit 4 is a circuit for synchronizing the operations of the CCD 5 and the LED (Light Emitting Diode) 8 with the operation of the carrier unit 3. The synchronizing signal generating circuit 4 is adapted to generate synchronizing signals SS based on carrying cycle signals VS outputted from the carrier unit 3.

Figure 5:
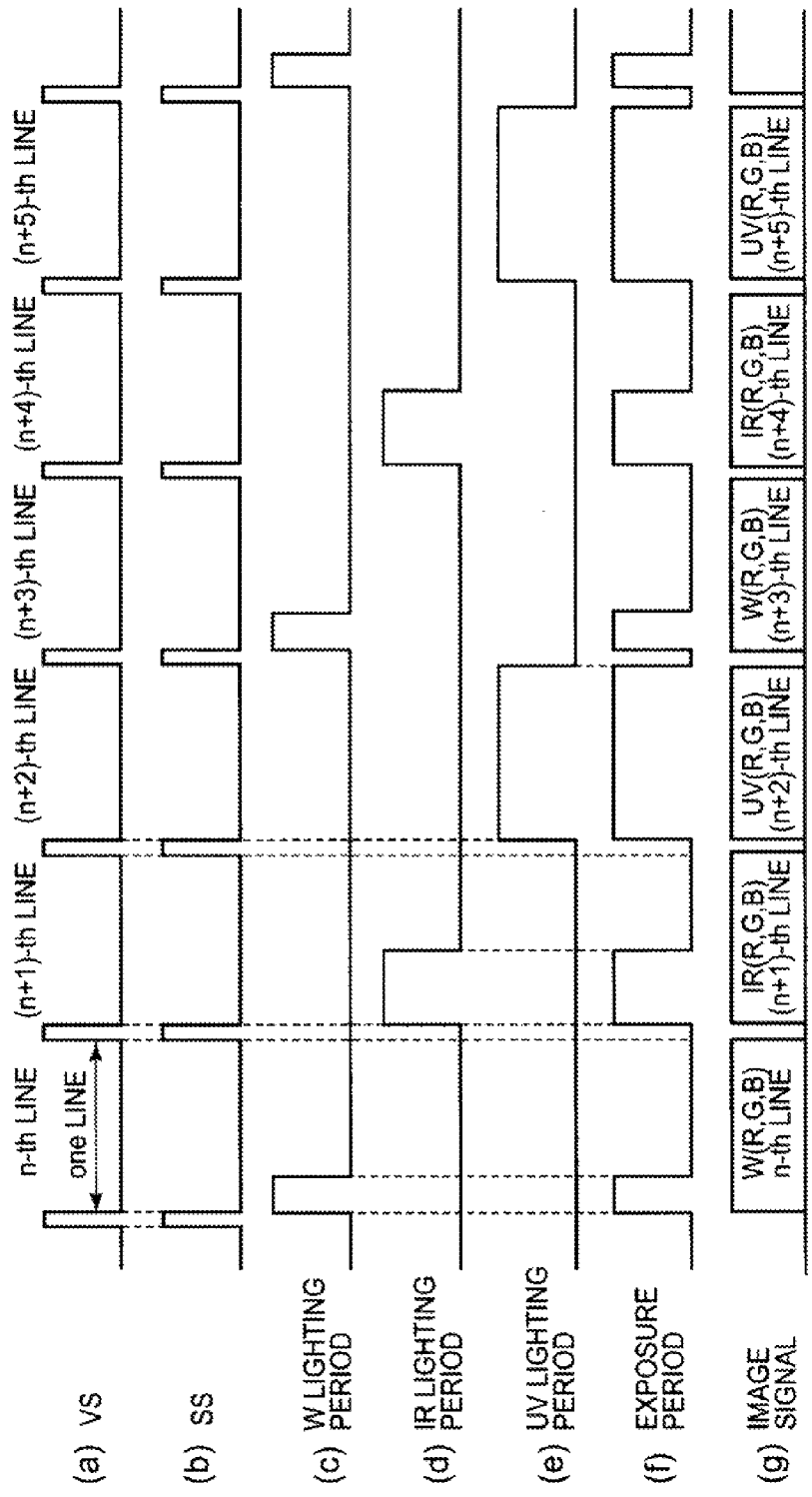
FIGS. 5A-5G are timing charts depicting the Operation of the image reading device.

The carrying cycle signals VS are raised to a high level ("High" level) per carry by one line of documents 2 on the side of the carrier unit 3 (see FIG. 5A), and a carrying cycle signal VS indicates carry timing (timing at which carrying by one line is started) and a carrying cycle (a period needed for carry by one line) of the documents 2. The carrying cycle signals VS are outputted, for example, from a carrier mechanism (e.g., a carrying motor and peripheral circuits thereof) inside the carrier unit 3. The synchronizing signals SS define the operation period of the CCD 5 and the LED 8 for one line and are generated so as to be in synchronization with the carrying cycle signals VS (see FIG. 5B).

The CCD 5 serves as an image sensor for reading images on documents 2 and includes three lines of line sensors 5a to 5c. The photosensitive surfaces of the line sensors 5a to 5c are applied with color filters of R (Red), G (Green), and B (Blue). The CCD 5 outputs image signals in three colors of R, G, and B. The CCD drive circuit 6 is a circuit for driving the line sensors 5a to 5c of the CCD 5. The CCD drive circuit 6 is adapted to output CCD driving signals CT in response to the synchronizing signals SS from the synchronizing signal generating circuit 4.

Figure 2:
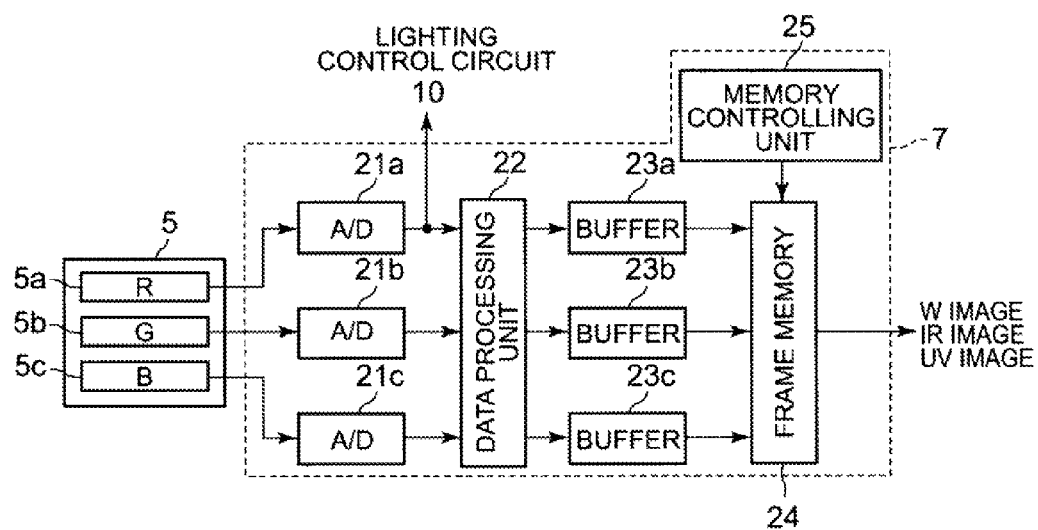
FIG. 2 is a block diagram depicting the configuration of a data processing unit depicted in FIG. 1.

The signal processing circuit 7 is a circuit for performing predetermined signal processing on the image signals outputted from the CCD 5. As depicted in FIG. 2, the signal processing circuit 7 includes three rows of signal processing systems corresponding to the three line sensors 5a to 5c, respectively.

The signal processing circuit 7 includes an A-D converters 21a to 21c for converting analog R signals, G signals, and B signals to digital signals to generate R data, G data, and B data, a data processing unit 22 for performing signal processing including shading correction on the image data, buffer memories (line memories) 23a to 23c for temporarily storing the R data, G data, and B data for one line, a frame memory 24 for storing the image data by one frame, and a memory controlling unit 25 for controlling the operation of writing data into the frame memory 24 and the operation of reading data from the frame memory 24. The outputs (R data) of the A/D converter 21a in the signal processing circuit 7 are also outputted to the lighting control circuit 10 as level reference data.

The LED 8 is a light source for use at the time of reading images. The LED 8 includes a white light source (hereinafter referred to as "W light source") 8a that serves as a light source of visible light, and an infrared light source 8b and an ultraviolet light source 8c (hereinafter referred to as "IR light source" and "UV light source") that serve as light sources of non-visible light. The LED drive circuit 9 is a circuit for driving the LED 8. The LED drive circuit 9 is adapted to supply drive current to the LED 8 in response to lighting signals LS and pausing signals PS from the lighting control circuit 10.

Figure 3:
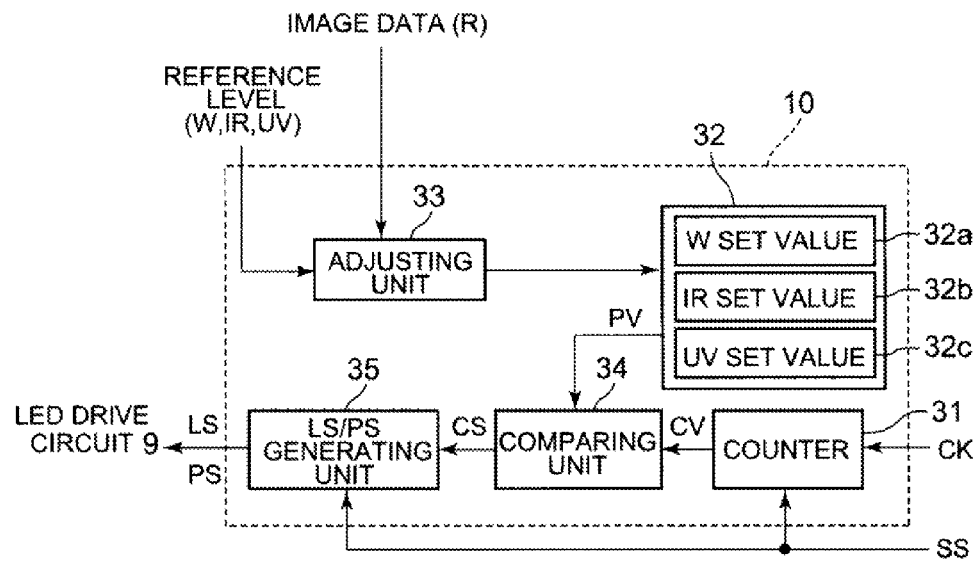
FIG. 3 is a block diagram depicting the configuration of a lighting control circuit depicted in FIG. 1.

The lighting control circuit 10 is a circuit for controlling lighting periods of the light sources 8a to 8c of the LED 8. As depicted in FIG. 3, the lighting control circuit 10 includes a counter 31, a register 32, an adjusting unit 33, a comparing unit 34, and a lighting/pausing signals generating unit (hereinafter referred to as "LS/PS generating unit") 35.

The counter 31 is adapted to take in the synchronizing signals SS from the synchronizing signal generating circuit 4 and clock signals with a predetermined cycle (for example, reference clock signals from a clock generating unit (not shown)) CK and to count the clock frequency of the clock signals CK over one cycle of a synchronizing signal SS. The register 32 is a memory device for holding set values of the lighting periods and retaining the set values 32a to 32c of the respective lighting periods of the W light source 8a, IR light source 8b, and UV light source 8c.

The adjusting unit 33 is adapted to fine-tune the lighting periods of the light sources 8a to 8c in the reading operation. Specifically, the adjusting unit 33 is adapted to compare the R data levels of the white light, infrared light, and ultraviolet light outputted from the signal processing circuit 7 with preset W, IR, and UV reference levels, respectively, to extend or shorten lighting periods of the light sources 8a to 8c in accordance with the differences. The comparing unit 34 is adapted to compare count values CV of the counter 31 with the set values 32a to 32c held in the register 32.

The LS/PS generating unit 35 is a circuit for outputting the lighting signals LS for lighting the LED 8 and the pausing signals PS for turning off the LED 8. The LS/PS generating unit 35 is adapted to change the levels of the lighting signals LS based on the synchronizing signals SS as well as the levels of the pausing signals PS based on the result of comparison at the comparing unit 34 (correspondence signals CS).

Next, the operation of the image reading device 1 is described with reference to FIGS. 1 to 6.

Prior to reading of a document 2, the W set value 32a, IR set value 32b, and UV set value 32c (the lighting periods of the light sources 8a to 8c) in FIG. 3 are set. The set values 32a to 32c are set according to the sensitivity of the CCD 5. Specifically, as depicted in FIG. 4, setting is made such that Lighting periods are longer in the order of the W light source 8a, IR light source 8b, and UV light source 8c.

The respective lighting periods of the light sources 8a to 8c are preferably set such that the levels of image data are substantially equal upon application of white light, application of infrared light, and application of ultraviolet light. "The levels . . . are substantially equal" means that, provided a reference level is the level of image data upon application of one of while light, infrared light, and ultraviolet light, the levels of the image data upon application of the other two kinds of light have a difference from the reference level that falls within ±0 to 10%.

Figure 4:
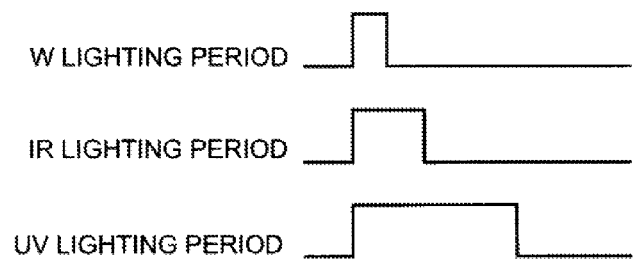
FIG. 4 is an explanatory diagram depicting lighting periods of light sources.

Since the sensitivity of the CCD b is extremely different to white light and to ultraviolet light, the UV lighting period, as depicted in FIG. 4, is longer than the W lighting period. However, the lighting periods of the light sources 8a to 8c cannot be set beyond one cycle of the carrying cycle signals VS (one scanning cycle of the carrier unit 3). In other words, a slower carry speed of documents 2 makes it hard to set the respective lighting periods of the light sources 8a to 8c such that the levels of image data become substantially equal to one another. Thus, the respective lighting periods of the light sources 8a to 8c may be set such that differences in level among image signals fall within a permissible range for input of the signal processing circuit 7 (i.e., level differences fall within ±10 to 50%).

Also, the setting processing of the W set value 32a, IR set value 32b, and UV set value 32c may be effected at a manufacturing stage or at the time of shipment of the image reading device 1, or at the time of initial setting prior to the reading operation. Further, the set values may take fixed values or may permit alteration according to the operation by users.

Then, for reading a document 2, the synchronizing signal generating circuit 4, as depicted in FIGS. 5A-5G, generates the synchronizing signals SS (see FIG. 5B) that are in synchronization with the carrying cycle signals VS (see FIG. 5A) from the carrier unit 3 and outputs the synchronizing signals SS to the lighting control circuit 10 and the CCD drive circuit 6. Next, the lighting control circuit 10 generates the lighting signals LS in synchronization with the synchronizing signals SS and outputs the lighting signals LS to the LED drive circuit 9, for lighting the W light source 8a of the LED 8 through the LED drive circuit 9 (see FIG. 5C).

The lighting control circuit 10 keeps outputting the lighting signals LS until the lighting period set for the white light (the W set value 32a) passes. Thus, the W light source 8a lights continuously until the lighting period (the W set value 32a) passes. The light is turned off when the lighting period passes. Accordingly, the line sensor 5a of the CCD 5 is exposed for a pre-specified lighting period (exposure period) (see the n-th line in FIG. 5F).

The CCD drive circuit 6 outputs the CCD driving signals CT in synchronization with the synchronizing signals SS. The line sensors 5a to 5c of the CCD 5 execute accumulation of charges and output of image signals while the CCD driving signals CT are being outputted (see FIG. 5G). Then, as depicted in FIG. 2, in the signal processing circuit 7, the A/D converters 21a to 21c perform A/D converter of the image signals from the CCD 5 to generate image data and output the image data to the data processing unit 22. The R image data (R data) is also outputted to the lighting control circuit 10.

Subsequently, the adjusting unit 33 in the lighting control circuit 10 compares, as depicted in FIG. 3, the level of the R data with the W (White) reference level. In case of the R data level being higher than the reference level, the lighting period of the W light source 8a (the W set value 32a) is shortened. In case of the R data level being lower than the reference level, control is performed such that the lighting period of the W light source 8a is extended. The R data level to be compared may be a level of data for one pixel or may be a level obtained from a plurality of pixels (for example, an average value of data for one line of pixels).

Figure 6:
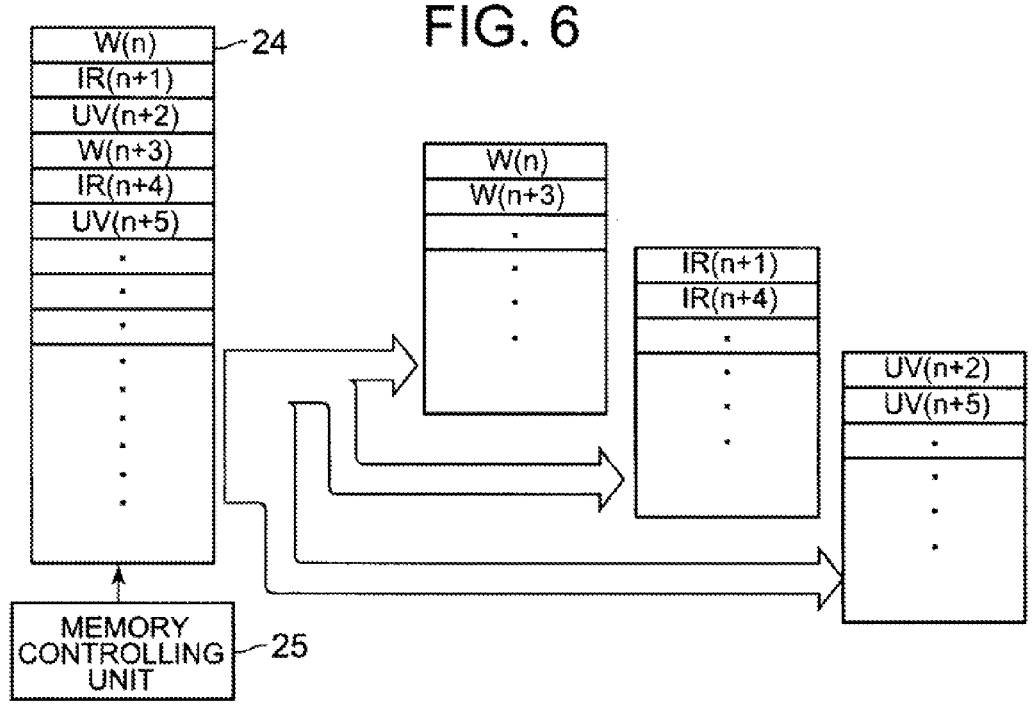
FIG. 6 is an explanatory diagram for describing writing and reading operations of image data.

In the signal processing circuit 7, the data processing unit 22 performs, as depicted in FIG. 2, signal processing on the R data, G data, and B data for storage on the buffer memories 23a to 23c. Next, signal-processed data is outputted sequentially starting from the buffer memory 23a to write the data on the frame memory 24 as depicted in FIG. 6.

Upon completion of reading of an initial line (the n-th line (n is a natural number) depicted in FIGS. 5A-5G), the luminescent light source is, as depicted in FIGS. 5A-5G, switched from the W light source 8a to the IR light source 8b. Then, the lighting control circuit 10 and the LED drive circuit 9 act to turn on the IR light source 8b for the lighting period set for the infrared light (the IR set value 32b) (see FIG. 5D) as in the case of the W light source 8a, to execute reading of the (n+1)-th line (see FIG. 5G).

For executing reading of the (n+1)-th line, as in the case that the W light source 8a is lighted, the adjusting unit 33 in the lighting control circuit 10 compares the R data level with the IR (InfraRed) reference level and adjust the lighting period of the IR light source 8b according to the difference. As described above, the R data, G data, and B data of the infrared light are obtained. The R data, G data, and B data of infrared light undergo signal processing at the data processing unit 22 to then be written on the frame memory 24 (see FIG. 6).

Upon completion of reading of the (n+1)-th line, as depicted in FIGS. 5A-5G, the luminescent light source is switched from the IR light source 8b to the UV light source 8c. Then, reading of the (n+2)-th line is executed. For executing reading of the (n+2)-th line, the UV light source 8c is lighted for the lighting period set for the ultraviolet light (the UV set value 32c) and the R data, G data, and B data of ultraviolet light are obtained.

Also in the case that the UV light source 8c is lighted, the adjusting unit 33 in the lighting control circuit 10 compares the R data level with the UV (Ultra Violet) reference data to adjust the lighting period of the UV light source 8c according to the difference.

As described above, comparison is each performed between the R data levels obtained and the respective reference levels for the light sources with respect to the white light, infrared light, and ultraviolet light, such that the respective lighting periods are adjusted to fit the characteristics of the light sources mounted in the image reading device 1.

Accordingly, even in case where given wavelengths are chosen for luminescence wavelengths of the light sources 8a to 8c, the lighting periods are automatically adjustable without configuring, for example, circuits individually optimized according to the luminescence wavelengths. More specifically, although the luminescence wavelengths for infrared light and ultraviolet light vary to a certain extent, adopting the above-described adjusting configuration enables appropriate setting of lighting periods suitable for the luminescence wavelengths for the light sources to be used without pre-specifying a plurality of circuit constants and controlling pulse widths according to the luminescence wavelengths of various kinds.

Note that executing adjustment of lighting periods for entire lines results in frequent alteration of lighting periods, leading rather to degradation in image quality. For this reason, adjustment of lighting periods is preferably executed once for one line within blank space of a document 2 at an early stage from the start of reading operation, or alternatively, for one line within blank space of the document 2 per page. Further, the adjustment of lighting periods may be executed using a dedicated white reference sheet, prior to reading of a document 2. The white reference sheet may be sheets separately prepared for W, IR, and UV, or may be joined into an integrated sheet.

After that, every time reading of one line is completed, the luminescent light source is switched in the order of the W light source 8*a*, IR light source 8*b*, and UV light source 8*c*. The light sources are each lighted for the set lighting period (see FIGS. 5(*c*) to 5(*e*)). Then, with switching processing of the light sources repetitively performed, image data for one frame is obtained per line and is stored sequentially on the frame memory 24.

To read image data from the frame memory 24, as depicted in FIG. 6, the addresses of W image data (the image data on the n-th and (n+3)-th lines) alone are first designated to read the W image data. Then, the addresses of IR image data (the image data on the (n+1)-th and (n+4)-th lines) are designated to read the IR image data. Next, the addresses of UV image data (the image data on the (n+2)-th and (n+5)-th lines) are designated to read the UV image data.

In this manner, W image data, IR image data, and UV image data are read sequentially, such that image data for one frame is split into image data by the kinds of applied light. The image data split is outputted to an inspection device or display device at a later stage for use in, for example, an inspection process.

As described above, in the present exemplary embodiment, in applying light to the CCD 5 by switchingly operating the W light source 8*a*, IR light source 8*b*, and UV light source 8*c*, the lighting period of a light source with a wavelength to which the CCD 5 is highly sensitive is set shorter, and the lighting period of a light source with a wavelength to which the CCD 5 is less sensitive is set longer. Thus, images are readable with light quantities that match the sensitivity of the CCD 5 regardless of the kinds of light applied to the CCD 5. Hence, extreme difference in brightness is preventable among W images, IR images, and UV images. As a result, images with stable brightness are obtainable.

Also, differences in level among image signals for W images, IR images, and UV images are suppressed to a lower level. As a result, signal processing is easily performed appropriately depending on the kinds of image signals. One signal processing circuit may be installed for W images, IR images, and UV images without the need to dispose separate signal processing circuits individually for the images. Accordingly, the device configuration is simplified, and the cost for the device is reduced.

Moreover, in the present exemplary embodiment, images are read with the W light source 8*a*, IR light source 8*b*, and UV light source 8*c* switchingly operated sequentially by lines, and image data for one frame that is held on the frame memory 24 is read while being split into image data by kinds of light. In other words, one time reading operation allows for simultaneous acquisition of W images, IR images, and UV images. Thus, a document 2 for which reading has been finished need not be sent back to a prior stage of the reading device, and the documents 2 may be carried one way. As a result, more rapid reading processing is achieved. Moreover, complex carrier mechanisms are eliminated, thus reducing the costs for the device.

The image reading device according to the present invention is not limited to image reading devices applied to inspection devices for printed materials. So far as the device is configured to read document images by switchingly applying visible light and non-visible light thereto, image reading devices according to the present invention may be applied widely irrespective of applied fields.

In the present exemplary embodiment, white light is used as visible light and infrared light and ultraviolet light are used as non-visible light; however, other kinds of light may be used for visible light, and other kinds of light may be used for non-visible light.

Moreover, in the present exemplary embodiment, a color CCD is used as the image sensor, but a monochrome CCD with no color filters provided may also be used for the image sensor.

Further, in the present exemplary embodiment, the W light source 8*a*, IR light source 8*b*, and UV light source 8*c* are switchingly operated per line, and the switching may be performed on a basis other than the line basis. The W light source 8*a*, IR light source 8*b*, and UV light source 8*c* may be switchingly operated by a plurality of lines.

Moreover, in the present exemplary embodiment, R data is used for level reference data in adjusting lighting periods; however, the level reference data may be any one of kinds of image data chosen from those outputted from the A/D converters 21*a* to 21*c*. More specifically, G data and B data may also be used.

Figure 7:
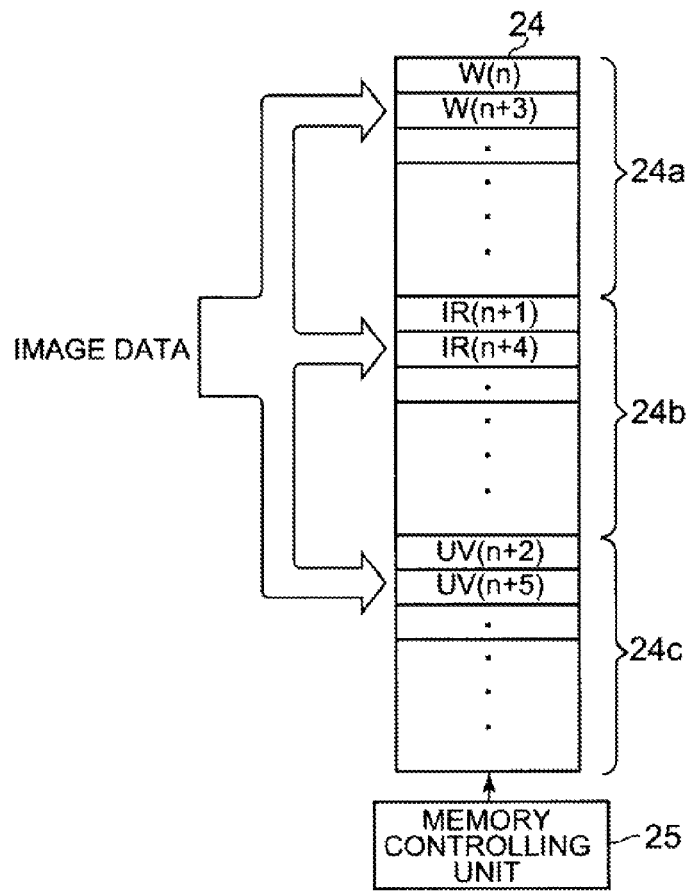
FIG. 7 is an explanatory diagram for describing writing and reading operations of image data.

In the present exemplary embodiment, image data for one frame is split into image data on the basis of kinds of light when image data is read from the frame memory 24. As depicted in FIG. 7, however, separate memory areas 24*a* to 24*c* may be individually secured for the kinds of light in the frame memory 24, and image data may be split when the image data is written on the frame memory 24.

Further, in the present exemplary embodiment, the carrying cycle signals VS are outputted to the synchronizing signal generating circuit 4, and signals that match both in phase and cycle with the carrying cycle signals VS are generated as the synchronizing signals SS. It should be noted however that the carrying cycle signals VS do not have to be fed back to the synchronizing signal generating circuit 4. As long as the running speed of documents is constant, such signals may be generated as the synchronizing signals SS as to have the same cycles as but have shifted phases from the carrying cycle signals VS. In other words, even if there exists a phase shift between the carrying cycle signals VS and the synchronizing signals SS, images are not affected insomuch as synchronization between the reading operation of the CCD 5 and the luminescence operation of the LED 8 (see FIGS. 5 (*b*) to (*g*)) is secured.

In the foregoing exemplary embodiment, an image reading device as described below is also disclosed.

The image reading device, wherein the first light source lighting period and the second light source lighting period are set such that the image signal upon application of visible light is substantially equal in level to the image signal upon application of non-visible light.

The image reading device, wherein the first light source lighting period and the second light source lighting period are set such that the Level of the image signal upon application of visible light and the level of the image signal upon application of non-visible light have a difference that falls within a permissible range for input of signal processing means provided at a later stage of the image sensor.

The image reading device further including: an adjusting unit for comparing the level of the image signal outputted from the image sensor with a predetermined reference level and extending and shortening the first and second light source lighting periods according to the difference between the image signal level and the reference level. An image reading device including such an adjusting unit allows for appropriate setting of lighting periods of light sources for use in terms of luminescence wavelengths without providing, for example, circuits individually optimized according to the luminescence wavelengths notwithstanding any given luminescence wavelengths are chosen for the light sources.

The image reading device further including: splitting means for splitting the image signal outputted from the image sensor into an image signal upon application of visible light and an image signal upon application of non-visible light. An image reading device including such splitting means allows for increase in speed of reading processing, since one time reading operation enables simultaneous acquisition of visible light images and non-visible light images. Also, cost for the device is reduced.

The image reading device, wherein the splitting means includes: a memory for holding image signals outputted from the image sensor; and a memory controlling unit for controlling writing operation and reading operation on the memory, the image signals held on the memory being adapted to be read per kind of applied light.

The image reading device, wherein the splitting means includes: a memory for holding image signals outputted from the image sensor, the memory having a first memory area for holding therein image signals upon application of visible light and a second memory area for holding therein image signals upon application of non-visible light; and a memory controlling unit for controlling the writing operation of data on the memory and the reading operation of data from the memory, and the image signals outputted from the image sensor are adapted to be sorted according to the kinds of applied light and to be written in the first memory area and the second memory area of the memory.

The image reading device, wherein the light source is adapted to switchingly apply visible light and non-visible light on a line basis.

The image reading device, wherein the non-visible light is infrared light or ultraviolet light, or infrared light and ultraviolet light.

The present invention has been described with reference to the exemplary embodiments as above, but the present invention is not limited to the foregoing exemplary embodiments. Various changes and modifications appreciable by those skilled in the art can be made to the configuration and details of the present invention within the scope of the present invention.

This application is based on Japanese Patent Application No. 2009-096580 filed with the Japan Patent Office on Apr. 13, 2009, the entire content of which is hereby incorporated by reference.

REFERENCE SIGNS LIST

1 Image reading device
2 Document
3 Carrier unit
4 Synchronizing signal generating circuit
5 CCD
5a to 5c Line sensor
6 CCD drive circuit
7 Signal processing circuit
8 LED
8a W light source
8b IR light source
8c UV light source
9 LED drive circuit
10 Lighting control circuit
21a to 21c A/D converter
22 Data processing unit
23a to 23c Buffer memory
24 Frame memory
25 Memory controlling unit
31 Counter
32 Register
33 Adjusting unit
34 Comparing unit
35 LS/PS generating unit

The invention claimed is:

1. An image reading device for reading an image on a document with visible light and non-visible light being switchingly applied thereto, comprising: an image sensor which reads the image on the document to output an image signal; a light source which switchingly emits visible light and non-visible light; a lighting control unit which controls lighting periods of the light source, and an adjusting unit which shortens a first light source lighting period for applying non-visible light in case the level of the image signal upon application of non-visible light is higher than a first reference level, extends the first light source lighting period in case the level of the image signal upon application of non-visible light is lower than the first reference level, shortens a second light source lighting period for applying visible light in case the level of the image signal upon application of visible light is higher than a second reference level, and extends the second light source lighting period in case the level of the image signal upon application of visible light is lower than the second reference level, while the image sensor is reading the image on the document, wherein the lighting control unit is adapted to perform control such that the first light source lighting period is longer than the second light source lighting period at the time of initial setting before the image sensor starts to read the image on the document.

2. The image reading device according to claim 1, wherein the first light source lighting period and the second light source lighting period are set such that the image signal upon application of visible light is substantially equal in level to the image signal upon application of non-visible light.

3. The image reading device according to claim 1, wherein the first light source lighting period and the second light source lighting period are set such that the level of the image signal upon application of visible light and the level of the image signal upon application of non-visible light have a difference that falls within a permissible range for input of a signal processing unit provided at a later stage of the image sensor.

4. The image reading device according to claim 1, further comprising:
a splitting unit which splits the image signal outputted from the image sensor into an image signal upon application of visible light and an image signal upon application of non-visible light.

5. The image reading device according to claim 4, wherein the splitting unit includes:
a memory which holds image signals outputted from the image sensor; and
a memory controlling unit which controls writing operation and reading operation on the memory,
the image signals held on the memory being adapted to be read per kind of applied light.

6. The image reading device according to claim 5, wherein the splitting unit includes:
a memory which holds image signals outputted from the image sensor, the memory having a first memory area for holding therein image signals upon application of visible light and a second memory area for holding therein image signals upon application of non-visible light; and
a memory controlling unit which controls the writing operation of data on the memory and the reading operation of data from the memory, and the image signals outputted from the image sensor are adapted to be sorted according to the kinds of applied light and to be written in the first memory area and the second memory area of the memory.

7. The image reading device according to claim 1, wherein the light source is adapted to switchingly apply visible light and non-visible light on a line basis.

8. The image reading device according to claim 1, wherein the non-visible light is infrared light or ultraviolet light, or infrared light and ultraviolet light.

9. An image reading device for reading an image on a document with visible light and non-visible light being switchingly applied thereto, comprising: means for reading the image on the document to output an image signal; means for switchingly emitting visible light and non-visible light; means for controlling lighting periods of the light source, and means for adjusting the first and second light source lighting periods, wherein the means for adjusting shortens a first light source lighting period for applying non-visible light in case the level of the image signal upon application of non-visible light is higher than a first reference level, extends the first light source lighting period in case the level of the image signal upon application of non-visible light is lower than the first reference level, shortens a second light source lighting period for applying visible light in case the level of the image signal upon application of visible light is higher than a second reference level, and extends the second light source lighting period in case the level of the image signal upon application of visible light is lower than the second reference level, while the image sensor is reading the image on the document, and wherein the means for controlling lighting periods is adapted to perform control such that the first light source lighting period is longer than the second light source lighting period at the time of initial setting before the image sensor starts to read the image on the document.

* * * * *